(12) United States Patent
Short et al.

(10) Patent No.: US 10,480,417 B2
(45) Date of Patent: Nov. 19, 2019

(54) AIR TURBINE START SYSTEM

(71) Applicant: Hamilton Sundstrand Corporation, Charlotte, NC (US)

(72) Inventors: Keith E. Short, Loves Park, IL (US); Daniel Richard Walker, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 527 days.

(21) Appl. No.: 15/209,984

(22) Filed: Jul. 14, 2016

(65) Prior Publication Data

US 2018/0016988 A1    Jan. 18, 2018

(51) Int. Cl.
| | |
|---|---|
| *F02C 7/277* | (2006.01) |
| *F01D 17/14* | (2006.01) |
| *F02C 7/27* | (2006.01) |
| *F01D 1/02* | (2006.01) |
| *F01D 19/02* | (2006.01) |
| *F02C 7/12* | (2006.01) |

(52) U.S. Cl.
CPC ............ *F02C 7/277* (2013.01); *F01D 17/145* (2013.01); *F01D 19/02* (2013.01); *F02C 7/125* (2013.01); *F01D 1/026* (2013.01); *F02C 7/27* (2013.01); *F05B 2240/241* (2013.01); *F05D 2220/32* (2013.01); *F05D 2240/241* (2013.01); *F05D 2260/20* (2013.01); *F05D 2260/85* (2013.01); *F05D 2260/96* (2013.01); *Y02T 50/676* (2013.01)

(58) Field of Classification Search
CPC .......... F01D 1/32; F01D 17/145; F01D 17/18; F01D 19/02; F01D 1/026; F01D 19/00; F01D 25/10; F01D 25/34; F02C 7/277; F02C 1/02; F02C 7/26; F02C 7/262; F02C 7/268; F02C 7/27; F02C 7/272; F02C 7/275; F05D 2260/85; F05D 2240/241; F05D 2240/242; F05B 2240/241; F02N 2200/041; F02N 7/08
See application file for complete search history.

(56) References Cited

U.S. PATENT DOCUMENTS 3,087,305 A * 4/1963 Hertzog ................. F02C 7/272
                                                  415/122.1
3,307,426 A    3/1967 Whitaker
(Continued)

FOREIGN PATENT DOCUMENTS

EP    2450550 A2    9/2012
RU    2123126 C1    12/1998

OTHER PUBLICATIONS

Communication received from the European Patent Office, extended European Search Report enclosed, dated Nov. 24, 2017, Application No. 17181133.4; pp. 7.

(Continued)

*Primary Examiner* — Gerald L Sung
*Assistant Examiner* — Stephanie Cheng
(74) *Attorney, Agent, or Firm* — Cantor Colburn LLP

(57) ABSTRACT

An air turbine starter device comprises a rotor arranged in a cavity of a housing, a first manifold having a cavity with a port operative to direct compressed air to the rotor, a second manifold having a cavity with a port operative to direct compressed air to the rotor, wherein the first manifold is larger than the second manifold.

16 Claims, 4 Drawing Sheets

(56) References Cited

U.S. PATENT DOCUMENTS

| | | | | |
|---|---|---|---|---|
| 3,973,591 | A * | 8/1976 | Kalb | F01D 17/145 |
| | | | | 137/625.12 |
| 4,604,028 | A * | 8/1986 | Yeaple | F01D 17/18 |
| | | | | 415/38 |
| 4,615,657 | A * | 10/1986 | Kreitmeier | F01D 3/04 |
| | | | | 415/104 |
| 4,694,791 | A | 9/1987 | Tanaka | |
| 5,435,125 | A * | 7/1995 | Telakowski | F02C 7/277 |
| | | | | 60/625 |
| 8,490,738 | B2 * | 7/2013 | Cong | B60K 3/04 |
| | | | | 180/302 |
| 8,661,834 | B2 * | 3/2014 | Tsuji | F02N 7/00 |
| | | | | 123/179.31 |
| 9,157,373 | B2 | 10/2015 | Bei et al. | |
| 2005/0276685 | A1 | 12/2005 | Wiggins et al. | |
| 2009/0211260 | A1 * | 8/2009 | Kesseli | F02C 1/02 |
| | | | | 60/786 |
| 2010/0178153 | A1 * | 7/2010 | Gehringer | F01D 17/145 |
| | | | | 415/1 |
| 2013/0091850 | A1 * | 4/2013 | Francisco | F01D 25/34 |
| | | | | 60/772 |
| 2014/0373553 | A1 | 12/2014 | Zaccaria et al. | |
| 2015/0040578 | A1 | 2/2015 | Betti et al. | |
| 2017/0016399 | A1 * | 1/2017 | Bedrine | F02C 6/02 |

OTHER PUBLICATIONS

European Office Action for Application No. 17 181 133.4-1007 dated Dec. 7, 2018; 5 pgs.

* cited by examiner

US 10,480,417 B2

AIR TURBINE START SYSTEM

BACKGROUND

Gas turbine engines often use an air turbine starter to start the gas turbine. The air turbine starter is usually mechanically connected to the gas turbine engine, and receives compressed air from an air source such as an auxiliary power unit or another compressed air such as an air compressor.

The compressed air enters a manifold and is distributed to a number of nozzles or other apertures that direct the compressed air to the turbine starter turbine that rotates when the compressed air exits the nozzles and impinges on the turbine starter turbine. The turbine starter turbine is mechanically connected through shafts and gearing to the gas turbine engine, which is driven to rotate to a starting speed by the air turbine starter. When the gas turbine engine is rotating at a starting speed, the gas turbine engine may be started and the air turbine starter may be mechanically disengaged from the gas turbine engine.

Typically the compressed air that enters the manifold of the air turbine starter is controlled by a valve that controls the flow of compressed air to the air turbine starter. Thus, when the valve is open the compressed air flows to the air turbine starter, and the gas turbine engine core rotates.

BRIEF DESCRIPTION

An air turbine starter device comprises a rotor arranged in a cavity of a housing, a first manifold having a cavity with a port operative to direct compressed air to the rotor, a second manifold having a cavity with a port operative to direct compressed air to the rotor, wherein the first manifold is larger than the second manifold.

An air turbine starter system comprises air turbine starter device comprises a rotor arranged in a cavity of a housing, a first manifold having a cavity with a port operative to direct compressed air to the rotor, and a second manifold having a cavity with a port operative to direct compressed air to the rotor, wherein the first manifold is larger than the second manifold, a first control valve operative to control a flow of compressed air to the first manifold and a second control valve operative to control a flow of compressed air to the second manifold.

A method for controlling an air turbine starter system comprises closing a first valve that is operative to control a flow of compressed air to a first manifold of an air turbine starter device, opening a second valve that is operative to control a flow of compressed air to a second manifold of an air turbine starter device, such that the flow of compressed air to the second manifold is operative to drive a rotor of the air turbine starter system to a first speed.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
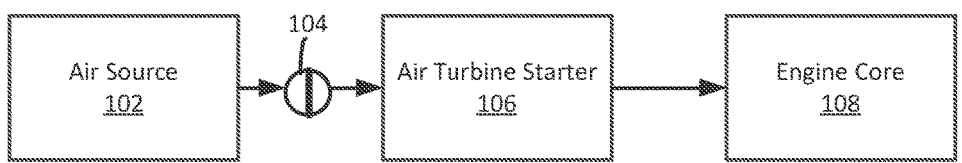
FIG. 1 illustrates block diagram of a prior art example of an air turbine start system.

FIG. 1 illustrates block diagram of a prior art example of an air turbine start system 100. The system 100 includes an air source 102 that outputs compressed air. A control valve 104 is arranged between the air source 102 and the air turbine starter 106. When the control valve 104 is in an open position, air flows from the air source 102 to the air turbine starter 106. The air turbine starter 106 is mechanically linked to the engine core 108 such that when the control valve 104 is open and air flows to the air turbine starter 106, the rotation of the air turbine starter 106 drives the engine core 108 to rotate.

In operation gas turbine engines, particularly engines used in commercial aircraft are started and stopped frequently. When a gas turbine engine is stopped, it starts to cool down. However, the internal components, for example, the rotor tend to cool at different rates such that portions of the rotor may warp or bow due to uneven temperatures in different parts of the rotor. Typically, the portions of the rotor that are located higher in the engine cool more slowly than the portions of the rotor that are located lower in the engine due to the thermal dynamic properties of the hot air in the engine.

If the engine is started while the rotor is warped, the rotor is effectively out of balance, which may cause undesirable wear to the engine.

To mitigate the warpage of the rotor, and instigate more even cooling in the engine core, operators have used the air turbine starter to rotate the engine core at a relatively low speed (below engine start speed) to circulate the air in the engine, and rotate portions of the engine from the cooler lower areas of the engine to the warmer upper areas of the engine. The rotation of the engine mitigates the warpage of the rotor due to the rotor being exposed to air having different temperatures in the upper portions of the engine and the lower portions of the engine, and the circulation of the air in the engine.

Referring to FIG. 1, the control valve 104 and the air turbine starter were designed to drive the gas turbine engine to a start speed, which is faster than the speed desired to effectively reduce the warpage of the rotor. Thus, to rotate the engine at a lower speed, the operator would repeatedly open and close the control valve 104 for short intervals. This repetitive type of operation tends to wear the control valve 104 prematurely, and does not use the air from the air source efficiently.

The methods and systems described herein provide for an air turbine starter system that has a secondary control valve and a secondary air manifold that allows the air turbine starter to be operated at a speed that is relatively lower than the engine start speed. The system reduces the wear on the control valves, reduces operator interaction with the system, rotates the engine core at a desired speed for uniform cooling, and uses the air from the air source more efficiently.

Figure 2:
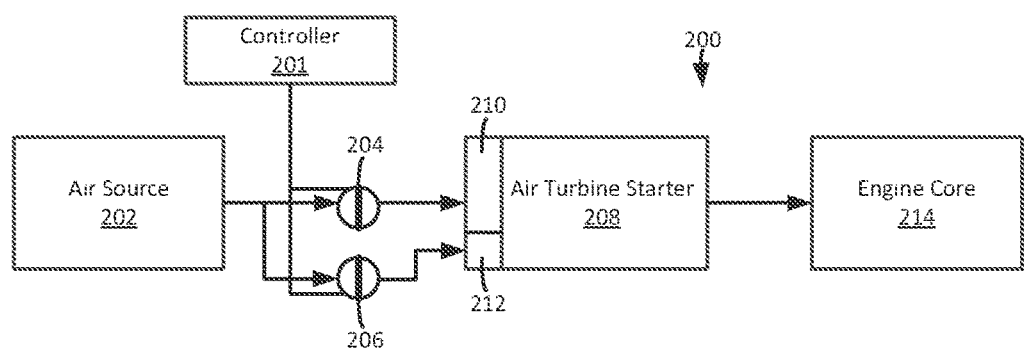
FIG. 2 illustrates a block diagram of an air turbine start system.

FIG. 2 illustrates a block diagram of an air turbine start system 200. The system 200 includes an air source 202, which may include any suitable compressed air source including, for example, bleed air, an air compressor, a compressed air tank, or an auxiliary power unit. The air source 202 is communicatively connected to the air turbine starter 208. The air turbine starter 208 includes a primary manifold 210 and a secondary manifold 212. The air turbine starter is operative to receive compressed air that drives a turbine in the air turbine starter 208. The air turbine starter 208 is mechanically connected through, for example, a gear assembly to the engine core 214 such that the rotation of the turbine in the air turbine starter 208 rotates the engine core 214.

In operation, the air from the air source 202 is routed to the primary manifold 210 and the secondary manifold 212. A primary control valve 204 controls the air to the primary manifold 210 and a secondary control valve 206 controls the air to the secondary manifold 212. The primary control valve 204 and the secondary control valve 206 as well as other components in the system 200 may be controlled by the controller 201 that may include, for example, a processor and memory operative to receive inputs and perform logical control functions.

Though the illustrated exemplary embodiment, shows a primary control valve 204 and a secondary control valve 206, alternate exemplary embodiments may include any suitable valve arrangement that is operative to control the flow of air from the air source 202 to the primary manifold 210 and the secondary manifold 212.

Figure 3:
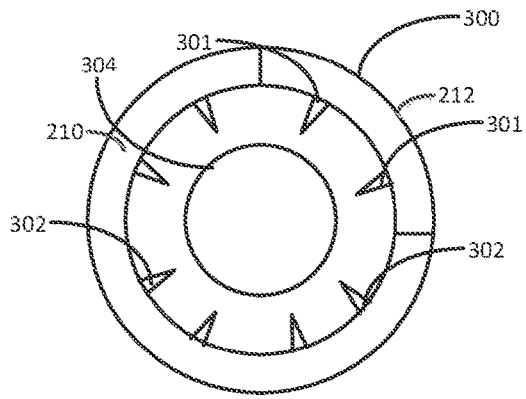
FIG. 3 illustrates a cross-sectional view of an example of the primary manifold and the secondary manifold.

FIG. 3 illustrates a cross-sectional view of an example of the primary manifold 210 and the secondary manifold 212. The primary manifold 210 and the secondary manifold 212 may partially define a housing 300 around the rotor 304. The primary manifold 210 receives air from the air source 202 and distributes the air to the nozzles 302 that port the air to the turbine 304 of the air turbine starter 208. The secondary manifold 212 also received air from the air source 202 and distributes the air to the nozzles 301. The secondary manifold 212 is smaller in volume than the primary manifold 210, and has fewer nozzles connected to the secondary manifold 212 than the primary manifold 210.

In operation, when the engine is cooling, an operator may open the secondary control valve 206 while the primary control valve 204 is closed, which allows compressed air from the air source 202 to enter only the secondary manifold 212 and flow through the nozzles 301 such that the air impinges on the turbine 304 and rotates the turbine in the air turbine starter 208. The rotation of the turbine 304 in the air turbine starter 208 drives the rotation of the engine core 214 at a speed that encourages an even cooling of the rotor and other engine core 214 components. This speed may vary by the type of engine; however it is lower than the start speed of the engine.

During a start operation, the primary control valve 204 and the secondary control valve 206 may both be opened (in some embodiments, the secondary control valve 206 may remain closed while the primary control valve 204 is open). When the primary control valve 204 and the secondary control valve 206 are both open, compressed air flows to the primary manifold 210 and the secondary manifold 212 such that all of the nozzles 302 and 301 emit air that impinges on the turbine 304. The flow of compressed air through all of the nozzles 301 and 302 results in the turbine 304 rotating at an engine start speed such that the engine core 214 accelerates to the engine start speed and may be started.

Since the secondary manifold is smaller and has less nozzles 301 than the primary manifold 210, the torque of the air turbine starter (and the mechanically linked turbine engine) is lower when only the secondary manifold 212 and associated nozzles 301 receive compressed air. The torque and speed of the air turbine starter 208 is higher and may reach starting speeds when at least the primary manifold 210 and the associated nozzles 302 receive compressed air.

Figure 4A:
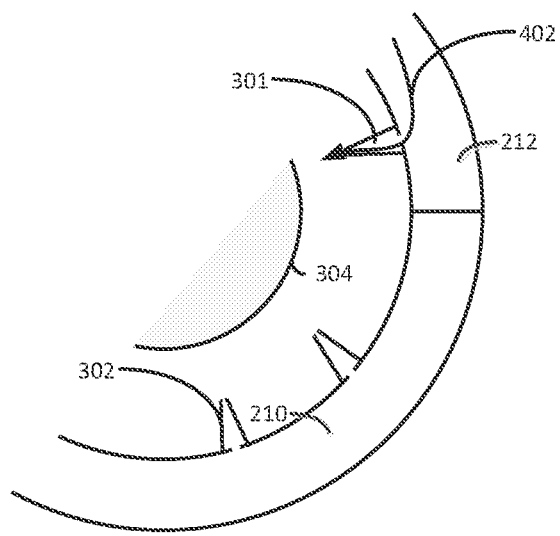
FIG. 4A illustrates a view of a portion of the primary manifold and the secondary manifold in operation.

FIG. 4A illustrates another view of a portion of the primary manifold 210 and the secondary manifold 212 in operation. When the primary control valve 204 is closed and the secondary control valve 206 is open, compressed air 402 flows from the secondary manifold 212 through the nozzles 301 to impinge on the turbine 304.

Figure 4B:
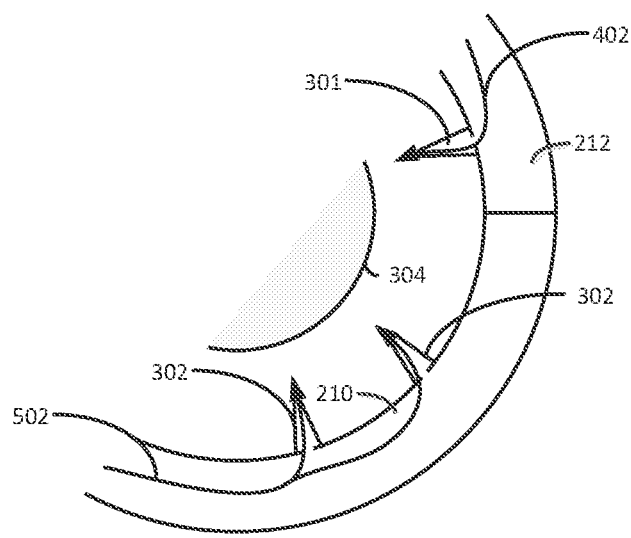
FIG. 4B illustrates another view of a portion of the primary manifold and the secondary manifold in operation.

FIG. 4B illustrates another view of a portion of the primary manifold 210 and the secondary manifold 212 in operation. When both the primary control valve 204 and the secondary control valve 206 are open, compressed air 402 flows from the secondary manifold 212 through the nozzles 301 to impinge on the turbine 304, and compressed air 502 flows from the primary manifold 210 through the nozzles 302 to impinge on the turbine 304.

Though the illustrated embodiment shows nozzles 301 and 302, alternate exemplary embodiments may include any type of suitable arrangement or components that are operative to port or deliver air to impinge on the rotor 304 including for example, ports, orifices, or any other arrangement that defines a flow path from the air source 202 (of FIG. 2) to the rotor 304 (of FIG. 3).

The methods and systems described herein provide for a turbine air start system that is operative to receive compressed air and drive the turbine air start system at a first speed and a second speed where the first speed is a cool down speed, and the second speed is an engine start speed. The system uses at least two manifolds to direct the flow of air to the turbine air start system. The first speed may be used to even the thermal distribution in the rotor of the gas turbine engine to reduce or substantially eliminate warpage of the rotor due to uneven heat distribution in the rotor. In a startup operation, the rotor may be rotated at the first, relatively slow, speed. Followed by increasing the airflow to the air turbine starter to accelerate the rotor to starting speed.

The use of a turbine air start system with dual manifolds allows the turbine air start system to operate at two different speeds without repetitive cycling of the primary control valve, which causes wear to the primary control valve, and uses the compressed air inefficiently.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. An air turbine starter device comprising:
a rotor arranged in a rotor cavity of a housing;
the housing comprising a first manifold having a first manifold cavity with a first manifold port operative to direct a first portion of compressed air to the rotor for rotation in a first direction;
the housing comprising a second manifold having a second manifold cavity with a second manifold port operative to direct a second portion of compressed air to the rotor for rotation in the first direction, wherein the first manifold is larger than the second manifold, wherein the air turbine starter is communicatively connected to a compressed air source providing the first portion of compressed air and the second portion of compressed air, wherein the first manifold is connected in parallel with the second manifold between the rotor and the compressed air source, and wherein the rotor is mechanically linked through a gear assembly to a core of a gas turbine engine such that rotation of the rotor rotates a compressor and a turbine of the gas turbine engine.

2. The device of claim 1, wherein the first manifold port is one of a plurality of first manifold ports, wherein the second manifold port is one of a plurality of second manifold ports, and wherein the first manifold includes a greater number of the first manifold ports than a number of the second manifold ports in the second manifold.

3. The device of claim 1, wherein the first manifold cavity of the first manifold defines a first manifold compressed air flow path for the first portion of compressed air that flows through the first manifold cavity of the first manifold, through the first manifold port of the first manifold, and through a nozzle that is communicative with the rotor cavity of the housing.

4. The device of claim 1, wherein the second manifold cavity of the second manifold defines a second manifold compressed air flow path for the second portion of compressed air that flows through the second manifold cavity of the second manifold, through the second manifold port of the second manifold, and through a nozzle that is communicative with the rotor cavity of the housing.

5. The device of claim 1, wherein the rotor is operative to rotate when either the first portion of compressed air, the second portion of compressed air, or both impinge on the rotor.

6. An air turbine starter system, the system comprising:
an air turbine starter device comprising:
a rotor arranged in a rotor cavity of a housing;
the housing comprising a first manifold having a first manifold cavity with a first manifold port operative to direct a flow of first manifold compressed air to the rotor for rotation in a first direction;
and the housing comprising a second manifold having a second manifold cavity with a second manifold port operative to direct a flow of second manifold compressed air to the rotor for rotation in the first direction, wherein the first manifold is larger than the second manifold;
a first control valve operative to control the flow of first manifold compressed air to the first manifold;
and a second control valve operative to control the flow of second manifold compressed air to the second manifold,
wherein the air turbine starter is communicatively connected to a compressed air source supplying the first manifold compressed air and the second manifold compressed air,
wherein the first manifold is connected in parallel with the second manifold between the rotor and the compressed air source,
and wherein the rotor is mechanically linked through a gear assembly to a core of a gas turbine engine such that rotation of the rotor rotates a compressor and a turbine of the gas turbine engine.

7. The system of claim 6, wherein the first manifold port is one of a plurality of first manifold ports, wherein the second manifold port is one of a plurality of second manifold ports, wherein the first manifold includes a greater number of the first manifold ports than a number of the second manifold ports in the second manifold.

8. The system of claim 6, wherein the first manifold cavity of the first manifold defines a first manifold compressed air flow path through the first manifold cavity of the first manifold, through the first manifold port of the first manifold, and through a nozzle that is communicative with the rotor cavity of the housing.

9. The system of claim 6, wherein the second manifold cavity of the second manifold defines a second manifold compressed air flow path through the second manifold cavity of the second manifold, through the second manifold port of the second manifold, and through a nozzle that is communicative with the rotor cavity of the housing.

10. The system of claim 6, wherein the rotor is operative to rotate when either the first manifold compressed air, the second manifold compressed air, or both impinge on the rotor.

11. The system of claim 6, wherein the system is operative to drive the air turbine starter at a first speed when the first valve is in a closed position and the second valve is in an open position, and the system is operative to drive the air turbine starter at a second speed when the first valve is in an open position.

12. The system of claim 11, wherein the first speed is lower than the second speed.

13. The system of claim 6, wherein the air turbine starter device is controlled by a controller.

14. A method for controlling an air turbine starter system having an air turbine starter device comprising:
a rotor arranged in a rotor cavity of a housing,
the housing comprising a first manifold having a first manifold cavity with a first manifold port operative to direct a flow of first manifold compressed air to the rotor for rotation in a first direction,
the housing comprising a second manifold having a second manifold cavity with a second manifold port operative to direct a flow of second manifold compressed air to the rotor for rotation in the first direction, wherein the first manifold is larger than the second manifold,
wherein the first manifold is connected in parallel with the second manifold between the rotor and a compressed air source supplying the first manifold compressed air and the second manifold compressed air,
and the rotor being mechanically linked through a gear assembly to a core of a gas turbine engine such that rotation of the rotor rotates a compressor and a turbine of the gas turbine engine, the method comprising:
closing a first valve that is operative to control the flow of first manifold compressed air to the first manifold of the air turbine starter device; and
opening a second valve that is operative to control the flow of second manifold compressed air to the second manifold of the air turbine starter device, such that the flow of second manifold compressed air to the second manifold is operative to drive the rotor of the air turbine starter system to a first speed.

15. The method of claim 14, further comprising: opening the first valve that is operative to control the flow of first manifold compressed air to the first manifold of the air turbine starter device, such that the flow of first manifold compressed air to the first manifold is operative to drive the rotor of the air turbine starter system to a second speed.

16. The method of claim 15, wherein the second speed is greater than the first speed.

\* \* \* \* \*